United States Patent
Bonner et al.

(10) Patent No.: US 7,217,782 B2
(45) Date of Patent: May 15, 2007

(54) COOLING OF PELLETS FROM PET SOLID STATING REACTOR WITH WATER

(75) Inventors: Richard Gill Bonner, Kingsport, TN (US); A Bob Debenport, Columbia, SC (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 10/696,880

(22) Filed: Oct. 30, 2003

(65) Prior Publication Data

US 2005/0096455 A1   May 5, 2005

(51) Int. Cl.
*C08F 6/00* (2006.01)
(52) U.S. Cl. .................... 528/499; 525/437; 525/439; 525/486; 525/503; 528/271; 528/272; 528/298; 528/308
(58) Field of Classification Search ............... 525/437, 525/439, 486, 503; 528/271, 272, 298, 308, 528/499
See application file for complete search history.

(56) References Cited

U.S. PATENT DOCUMENTS

| 552,361 | A | * | 12/1895 | Tung et al. ................. 493/186 |
| 5,523,361 | A | | 6/1996 | Tung et al. |
| 5,762,851 | A | * | 6/1998 | Hachiya et al. ........ 264/211.24 |
| 2003/0039594 | A1 | | 2/2003 | Pikus |

OTHER PUBLICATIONS

International Search Report.
Letter from Gala Industries, Inc., 181 Pauley Street, Eagle Rock, VA 24085 USA; dated Sep. 21, 2005, with attachments.
Copies of blue prints from Gala Industries.
Follow-up letter from Gala Industries, Inc., 181 Pauley Street, Eagle Rock, VA 24085 USA.

* cited by examiner

*Primary Examiner*—Terressa Boykin
(74) *Attorney, Agent, or Firm*—Dennis V. Carmen; Bernard J. Graves, Jr.

(57) ABSTRACT

Energy savings are realized during the commercial production of polyethylene terephthalate by partially cooling polyethylene terephthalate pellets exiting a solid stating reactor by contact with water, and using the residual heat stored in the pellets to vaporize associated water to form dry pellets.

15 Claims, 1 Drawing Sheet

COOLING OF PELLETS FROM PET SOLID STATING REACTOR WITH WATER

BACKGROUND OF THE INVENTION

1. Field of the Invention

The present invention pertains to the commercial manufacture of polyester polymers, in particular, polyethylene terephthalate ("PET") polymers.

2. Background Art

PET has numerous uses, principle among which are for films, fibers, and food containers. Despite the stringent matrix of properties required for such uses, particularly for food packaging, PET has become a commodity polymer. Commercial production of PET is energy intensive, and therefore even relatively small improvements in energy consumption are of considerable commercial value.

The production of PET (inclusive of copolymers) begins with an esterification step where the dicarboxylic acid component, predominantly terephthalic acid, is slurried in ethylene glycol and heated to produce a mixture of oligomers of a low degree of polymerization. This "esterification" step may be followed by a further "oligomerization" or "prepolymer" step, where a higher degree of polymerization is obtained. The product still has a very low molecular weight at this stage.

The previously described steps are then followed by a polycondensation. The polycondensation is catalyzed by metal compounds such as Sb, Ti, Ge, Sn, etc. Polycondensation occurs at relatively high temperature, generally in the range of 280–300° C., under vacuum, water and ethylene glycol produced by the condensation being removed. The polymer at the end of polycondensation has an inherent viscosity generally in the range of 0.4 to 0.65, corresponding to a molecular weight too low for many applications.

Commercial production of PET and other polyesters as well has required a subsequent post-polymerization in the solid state, termed "solid stating." In this stage of the process, polyester pellets are heated in inert gas, preferably nitrogen, in a solid state polymerization reactor, often termed a "solid stating reactor" or "solid stater", at temperatures below the melt temperature, i.e. from 210–220° C. in the case of PET. Solid stating is complicated by the fact that most PET polymers and other polyesters as well, following extrusion from the melt and pelletizing, are substantially amorphous. In order to prevent the pellets from sintering and agglomerating in the solid stater, the pellets are first crystallized over a period of 30 to 90 minutes at a lower temperature, e.g. 160–190° C., typically in a flow of inert gas. It should be noted that "solid stating" herein refers to the solid state polycondensation per se, and not to the combined processes of crystallization and solid state polycondensation.

Following polycondensation in the solid state, it has been the practice to cool the pellets in a stream of cool air or nitrogen gas, which is then cooled and recycled. Considerable quantities of gas are required, as well as circulation pumps of large capacity. Moreover, the equipment required for cooling is large, and thus capital intensive. Use of water for cooling is not known, most likely because it had been thought that water associated with water-cooled pellets required complete removal. as otherwise it may cause polymer hydrolysis during processing steps such as extrusion and injection molding. For these reasons, PET pellets are thoroughly dried before use.

In U.S. published application 2003/0039594 A1, a method is disclosed for cooling hot polymer pellets from a solid stating reactor where a conventional fluidized bed cooler is used, but augmented by water spray into the cooler proximate the hot pellet inlet. A first section of cooler is isolated from a further section, the first section operating minimally at 230° F. to avoid overwetting of pellets. The object of the '594 publication is to utilize the heat of vaporization of water to aid in pellet cooling, while also reducing the flow of gas to the cooler. However, by spraying water over the bed in the heated chamber, considerable water is vaporized by contact with hot gas rather than hot pellets, and when a closed gas recirculation system is employed, a dehumidifier must be added to the gas recirculation line. Not only does the process of the '594 publication involve only a modest improvement in energy usage in the pellet cooling process, it moreover requires monitoring and adjustment of additional parameters in the fluidized bed cooling unit.

It would be desirable to provide a process for cooling pellets which does not require a large volume air stream, and yet which provides pellets which are suitable for later processing by conventional molding technology such as injection molding.

SUMMARY OF THE INVENTION

The present invention is directed to a process for cooling hot pellets exiting a solid stating reactor wherein the hot pellets are contacted with water in the liquid phase to cool the pellets to a temperature preferably within the range of 50° C. to 120° C., and optionally using the residual heat contained in the pellets to evaporate water associated with the pellets.

DETAILED DESCRIPTION OF THE PREFERRED EMBODIMENT(S)

Figure 1:
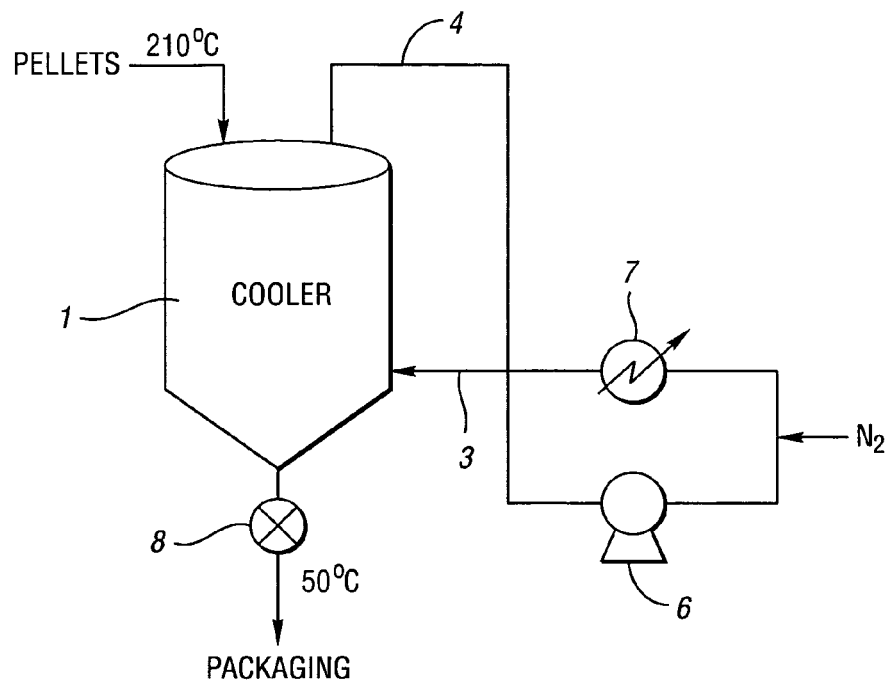
FIG. 1 illustrates the prior art method of cooling hot PET pellets exiting a solid stating reactor.

The invention pertains to any polyester which is solid state polymerized at high temperatures. The most common of such polyesters is PET, and the remainder of the specification will be addressed to this polymer as illustrative of the process which can be employed with polyesters generally.

The PET polymers are conventional, and are polymers prepared from terephthalic acid and ethylene glycol. While dimethylterephthalate may in principle be used as well as terephthalic acid, use of the latter is preferred. In addition, the PET polymers may contain up to 20 mol percent, preferably up to 10 mol percent, and more preferably no more than 5 mol percent of dicarboxylic acids other than terephthalic acid, and the same mol percentages of glycols (diols) other than ethylene glycol.

Examples of other suitable dicarboxylic acids which may be used with terephthalic acid are isophthalic acid, phthalic acid, naphthalene dicarboxylic acids, cyclohexane dicarboxylic acids, aliphatic dicarboxylic acids, and the like. This list is illustrative, and not limiting. In some cases, the presence of minor amounts of tri- or tetracarboxylic acids may be useful for generating branched or partially crosslinked polyesters. Isophthalic acid and naphthalene dicarboxylic acids are the preferred dicarboxylic acid when mixtures of acids are employed.

Examples of diols other than ethylene glycol which may be employed include, but are not limited to, 1,2-propane diol (propylene glycol), 1,3-propane diol (trimethylene glycol), diethylene glycol, triethylene glycol, dipropylene glycol, 1,4-butanediol, 1,6-hexanediol, cyclohexanediol, neopentylglycol, and cyclohexanedimethanol. Preferred glycols other than ethylene glycol include diethylene glycol, and most preferredly, cyclohexanedimethanol ("CHDM"), the latter generally used as a mixture of isomers. In addition, polyols such as pentaerythritol, glycerine, and trimethylolpropane may be used in most minor quantities when branched or partially crosslinked polyesters are desired. Most preferably, only difunctional carboxylic acids and difunctional hydroxyl-functional compounds (glycols) are employed.

The esterification, oligomerization, and other process steps up to and including the solid stating reactor are conventional. Polycondensation in the solid state generally occurs in a reactor termed a "solid stating reactor," at temperatures within the range of 200° C. to a temperature just below the melt temperature of the polymer, i.e. 2–10° C. below the melt temperature of the polymer, and thus pellets exiting the solid stating reactor typically have a temperature in excess of 180° C. Pellets of polyesters with higher melting points may be polycondensed at correspondingly higher temperatures.

In the inventive process, the "hot" pellets are contacted with a quantity of liquid water such that the temperature of the pellets is lowered, preferably to within the range of about 50° C. to about 120° C., more preferably 50° C. to 90° C. Following cooling to the desired temperature, the pellets are separated from water by conventional means, such as a screen, perforated plate, centrifugal separator, or the like. All water need not be removed, and the pellets may appear wet following water removal. At this stage, the pellets desirably contain less than 60% by weight water, preferably less than 25% by weight. The pellets may then be dried, if desired, in a conventional pellet dryer, to a yet lower water content.

The pellets, regardless of whether the optional dryer is used, are suitable for all molding processes for which PET pellets are conventionally used. The thorough drying at the customer site, i.e. where molding is to take place, will remove the last vestiges of water, and hence full drying during the production phase can be dispensed with. When an optional dryer is used, absolute dryness is not necessary, and the air flow (or nitrogen) through the dryer at this stage is minimal, and far less than that required to cool the pellets in the absence of water cooling.

In preferred embodiments, the temperature of the pellets may be such that the pellets, together with any remaining water associated with them, can be dried without the addition of more than a minor amount of heat, preferably without the addition of any heat. It is preferable that the temperature of the pellets be slightly in excess of the temperature required for volatilization of water, in which case the product pellets will be substantially dry prior to packaging, even in the case where process excursions vary the mass of pellets relative to the mass of associated water at any point in time. The pellet temperature may be higher or lower than the range of 50° C. to 120° C. in some cases, particularly on the high end of this preferred range. For example, a temperature of greater than 120° C. may be desirable if an unusually large amount of water is associated with the pellets, and it is desired to eliminate this water substantially completely.

When this "self-drying" is desired, the cooled pellet target temperature can easily be calculated approximately beforehand, taking into account the heat capacity of the particular polyester, generally about 0.44cal/g.° C., the amount of water which will remain associated with the pellets, and the desired prepackaging temperature of the pellets, i.e. the temperature of the dry pellets exiting the dryer. The amount of heat required to remove water is approximately equal to its heat of vaporization, while the heat released by the cooling pellet is $C_p T$, where $C_p$ is the heat capacity of the polyester and T is the change in temperature of the hot, wet polyester pellets and the dry, "cool" polyester pellets. A more exact calculation can easily be made.

When a dryer is used, in order to operate efficiently, the bulk of the cooling water should be removed by mechanical means, i.e. by centrifugation, use of filter screens, etc., as described previously. These techniques are well known. Water may also be removed by mechanical means in the dryer per se.

In the case where only minimal water remains associated with the pellets, drying may be accomplished simply by evaporation on a traveling belt or other means. Generally, however, the pellets are introduced into a non-heated drier, or a drier heated only by hot gas and/or water vapor which is derived from initial contact of the hot pellets with cooling water. Thus, it is preferable that no external heat, e.g. heat not supplied by the PET production process itself, be supplied.

The type of dryer used is not critical. Both agitated dryers as well as fluidized bed dryers may be used, and are commercially available. Drying preferably takes place in a stream of air or inert gas, e.g. nitrogen, or under reduced pressure. Water vapor removed from the dryer may be condensed, if desired, and mixed with the pellet cooling water, which is preferably reused. By "dry pellets" is meant pellets which appear dry to the touch, e.g. pellets which contain substantially no surface water. Some water may be absorbed within the pellets, however this amount is generally small.

Should the cooling water be hotter than desired coming from the dryer, water separator, etc., it may be cooled by a refrigeration unit or by a heat exchanger such as a radiator (for air cooling) or heat exchanger (for liquid cooling). In the case of heat exchangers employing liquid coolants, plant water or river water may be used as the cooling medium.

FIG. 1 illustrates the prior art technique of pellet cooling. Hot pellets enter the cooler 1. Nitrogen gas is introduced into the cooler by line 3. While in the cooler 1, the gas is heated as the pellets cool, and hot gas exits the cooler through line 4, where it is pumped by blower 6 through chiller 7 and recycled back to the cooler. Cool pellets exit the cooler through outlet 8 for packaging, loading into bins, railroad cars, etc. The exit temperature of the pellets is preferably about 50° C. or less. Due to the low heat capacity of nitrogen, a considerable flow of gas is necessary, and due to the size of the cooler and capacity of the pumps, considerable capital investment is required.

Figure 2:
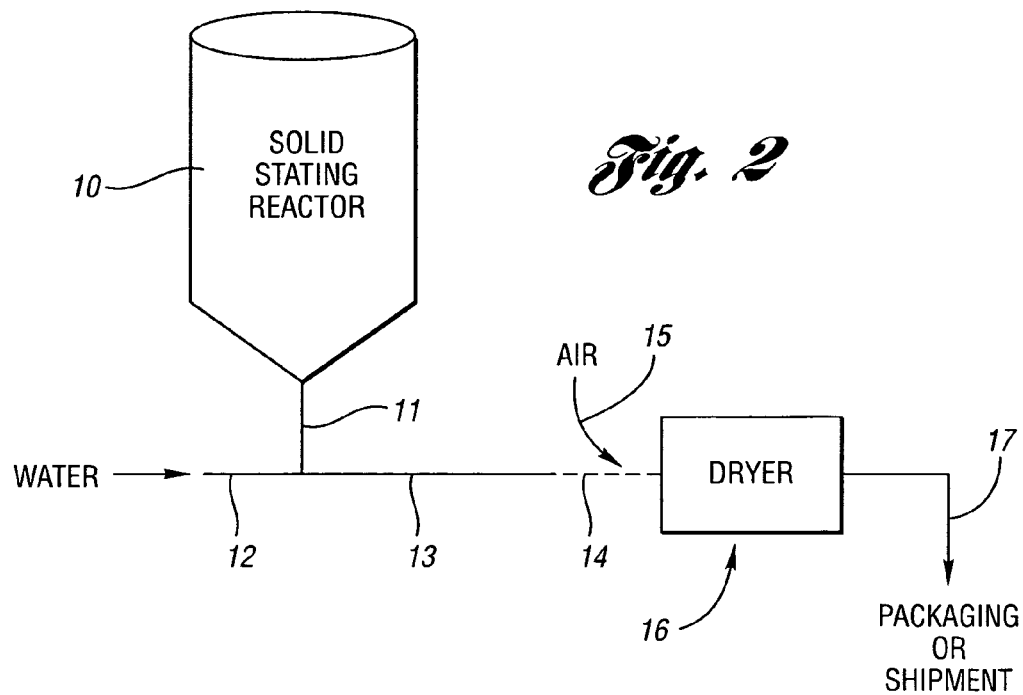
FIG. 2 illustrates one embodiment of a process for cooling hot PET pellets in accordance with the subject invention.

The subject invention may be illustrated by FIG. 2. Pellets in the solid stating reactor 10 exit the reactor through line 11, at a temperature of, for example, 210° C. to 220° C., in the case of PET. Water flows through line 12, into which hot pellets from line 11 are directed. A mixture of water and pellets flows through line 13 to an optional, but preferable water separator 14, which may be, for example, a foraminous screen, centrifugal separator, etc. The pellets then enter dryer 16, assisted by an optional flow of air 15. After drying, the pellets are directed through line 17 for shipment or packaging.

The amount of water input to line 12 is, in general, considerably greater than the amount of pellets, on a volume/volume basis, so that a flowable slurry of particles in water may be formed. The amount of water relative to pellets on a weight basis is such that by the time the pellets reach the dryer 16, they are below 140° C., preferably in the range of 50–120° C., and most preferably in the range of 50–90° C.

Water removal preferably takes place at 14 by conventional water removal methods currently practiced, for example that practiced in removing water from wet pellets from the pelletizer prior to entry into the crystallizer of the conventional PET process. Pelletization is ordinarily conducted under water, and thus the pellets are associated with a relatively large amount of water at this stage of the process. Foraminous surfaces, i.e. screens, perforated plates, etc., are generally used for this purpose, and may be vibrated screens, moving screens, and the like. Pellets may be urged to continue past the screen by a flow of air, by mechanical means, or where the screens are tilted from the vertical, by gravity.

The dryer 16 may be a commercial drying unit, as is now commonly employed prior to the crystallizer in the conventional PET process. Such dryers are well known, and are available from numerous sources such as Bepek, Gala, and Reiter. In such dryers, drying is ordinarily accomplished through the use of hot air. However, in the present case, the air is preferably not heated, as the pellets themselves are still relatively warm. Due to water contained on or with the pellets, the temperature of the pellets will rapidly fall as the water evaporates, and the temperature of the relatively dry pellets exiting the drier should preferably by about 60° C. or less, preferably 50° C. or less.

The drier may also be of the centrifugal type, where a considerable portion of water associated with the pellets is removed by centrifugal force, while a further portion evaporates. Such a centrifugal dryer can perform both the functions of initial water removal which might otherwise by performed by a foraminous water removal device, and further drying of the pellets, optionally aided by a gas stream.

The "dry" pellets which are packaged or shipped may appear truly dry, or may be "damp" pellets, e.g. containing up to 10 wt. % water, or less than 2% by weight water.

The present invention has numerous advantages over the prior art. First, due to contact with liquid water in relatively large quantity, the pellets are rapidly cooled, and thus the amount of gas recirculated will be limited to that involved in the drying unit, when the latter is used. In the case of mechanical dryers such as centrifugal dryers, very little if any gas will need to be recirculated.

Second, due to the fact that the pellets are rapidly cooled to a relatively low temperature, air may be used for subsequent operations rather than nitrogen or other inert gas. Thus, the expense of employing large quantities of nitrogen is eliminated.

Entry of pellets into the cooling water may take place through use of an air stream, by gravity flow, or by spraying with jets or sprays of water. If the latter are used, they may take the place of a flow of water into line 12. However, it should be noted that the total amount of water employed at this stage should be such that the pellets are still rapidly cooled to preferably 50–120° C., and the pellets are actually wet with water at this point. Use of an amount of water which immediately vaporizes while leaving the pellets at a temperature higher than 120° C. is not contemplated by the invention, as then cooling air will again be required, and the full benefits of the invention will not be obtained.

Water separated in the dryer or prior thereto is preferably recirculated, and will likely require cooling. The amounts of cooling water required to be circulated is minimal, as opposed to the much higher volume of air or nitrogen which would otherwise be required. Moreover, chilling of the recovered water with river or plant water is entirely feasible due to the relatively small volume involved, and cooling efficiency is high, whereas with large volumes of gas, heat exchange is less practical and somewhat inefficient. Overall, the processes described herein offer a considerable savings in capital costs and operating costs.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A process for cooling polyethylene terephthalate pellets exiting a polycondensation solid stating reactor in a polyethylene terephthalate production process, comprising contacting pellets exiting a solid stating reactor with liquid water in an amount sufficient to lower the temperature of said pellets to a first temperature within the range of about 50° C. and about 120° C., removing liquid water from said pellets, and recovering cooled pellets containing about 10 weight percent or less of water.

2. The process of claim 1, wherein said step of contacting is effected by at least one spray of water which contacts said pellets.

3. The process of claim 1 wherein said step of contacting comprises directing pellets exiting said solid stating reactor into a moving stream of water.

4. The process of claim 1, wherein following cooling to said temperature within the range of about 50° C. and about 120° C., said pellets are introduced into a mechanical dryer.

5. The process of claim 4, wherein said dryer is a paddle dryer or a fluidized bed dryer.

6. The process of claim 4, wherein pellets are separated from at least a portion of water associated with said pellets by mechanical means before entry into said dryer or within said dryer.

7. The process of claim 4, wherein drying is effected without the addition of external heat.

8. The process of claim 4, wherein said dryer is heated by process heat derived from another portion of said PET production process.

9. The process of claim 1, wherein water used in the process is recovered and recirculated to the process.

10. The process of claim 9, wherein prior to contacting pellets in water, water being recirculated to the process is chilled.

11. The process of claim 10, wherein water being recirculated is chilled by means of a heat exchanger.

12. The process of claim 1, further comprising removing liquid water from wet pellets, said wet pellets having a first temperature of from about 50° C. to about 120° C. to provide moist pellets having a first water content of less than 60% by weight, and volatizing water from said moist pellets due to heat retained by said pellets, and recovering pellets having a second temperature lower then said first temperature and a water content lower then said first water content.

13. The process of claim 12, wherein said step of volatizing water takes place in a mechanical dryer in a flow of gas.

14. The process of claim 13 wherein said gas is not heated prior to entry into said dryer.

15. The process of claim 12, wherein the water content of pellets following said step of recovering is less then 2% by weight.

* * * * *